United States Patent
Wootton et al.

(10) Patent No.: US 7,326,269 B2
(45) Date of Patent: Feb. 5, 2008

(54) NBC FILTRATION UNIT PROVIDING UNFILTERED AND FILTERED AIR PATHS

(75) Inventors: John Wootton, St. Louis, MO (US); Asdrubal Garcia-Ortiz, Chesterfield, MO (US)

(73) Assignee: Engineered Support Systems, Inc., St. Louis, MO (US)

( * ) Notice: Subject to any disclaimer, the term of this patent is extended or adjusted under 35 U.S.C. 154(b) by 313 days.

(21) Appl. No.: 10/769,973

(22) Filed: Feb. 2, 2004

(65) Prior Publication Data
US 2007/0101688 A1 May 10, 2007

Related U.S. Application Data

(60) Provisional application No. 60/444,072, filed on Jan. 31, 2003.

(51) Int. Cl.
*B01D 50/00* (2006.01)

(52) U.S. Cl. .......................... 55/385.2; 55/309; 55/312; 55/314; 55/418; 55/420; 55/DIG. 34; 95/12; 95/22; 95/273; 96/397; 96/399; 96/143; 210/130; 210/433

(58) Field of Classification Search ................ 454/229, 454/233, 236, 239; 95/278, 283, 286, 12, 95/22, 273; 96/400, 402, 405, 421, 397, 96/399, 143; 55/309, 312, 314, 385.2, 418, 55/420, DIG. 34; 210/130, 433

See application file for complete search history.

(56) References Cited

U.S. PATENT DOCUMENTS 3,775,949 A * 12/1973 Wachter ...................... 96/136

(Continued)

FOREIGN PATENT DOCUMENTS

DE 2312303 A * 3/1984

(Continued)

OTHER PUBLICATIONS

Technical Manual, Operator, Unit Direct Support and General Support Maintenance Manual, Field Deloyabl Environment Control Unit, Models FDECU-2, FDECU-3 and FDECU-4 (NSN 4120-01-449-0459), Army Technical Manual TM 9-4120-411-14 and Air Force Technical Manual T.O. 35E9-314-1.

*Primary Examiner*—Minh-Chau T. Pham
(74) *Attorney, Agent, or Firm*—Lewis, Rice & Fingersh, L.C.

(57) ABSTRACT

A filtration unit for use with an environmental control unit (ECU), usually a portable ECU, which includes at least two air flow paths wherein at least one of the air flow paths allows for use of air which has not passed through a nuclear, biological, and chemical (NBC) filter and at least one other does. The filtration unit may have at least three air paths, at least two of which provide NBC filtered air. This filtration unit can provide for longer expected operational life before filter replacement is required in both contaminated and non-contaminated environments. Further, the filtration unit may include remote sensing and control apparatus allowing for quick switching between operational modes depending on the need for filtered vs. unfiltered air and for a decreased reliance on personnel for maintenance and control, and a more simplified setup.

21 Claims, 9 Drawing Sheets

U.S. PATENT DOCUMENTS

| | | |
|---|---|---|
| 4,526,013 A | 7/1985 | Joy |
| 4,934,142 A * | 6/1990 | Hayashi et al. ............... 60/297 |
| 4,983,190 A | 1/1991 | Verrando et al. |
| 5,090,972 A * | 2/1992 | Eller et al. ..................... 95/10 |
| 5,489,319 A * | 2/1996 | Tokuda et al. ............... 96/400 |
| 5,665,143 A | 9/1997 | Jarvis et al. |
| 5,900,043 A * | 5/1999 | Grandjean et al. ............ 95/29 |
| 5,925,172 A * | 7/1999 | Rick et al. ................... 96/397 |
| 6,090,187 A * | 7/2000 | Kumagai .................... 95/278 |
| 6,149,699 A * | 11/2000 | Grantham ................. 55/385.2 |
| 6,168,085 B1 * | 1/2001 | Garcia ...................... 236/44 C |
| 6,402,812 B1 * | 6/2002 | Perrotta et al. ................ 95/95 |
| 6,796,896 B2 * | 9/2004 | Laiti .......................... 454/229 |
| 2005/0059347 A1 * | 3/2005 | Haartsen .................... 455/41.2 |

FOREIGN PATENT DOCUMENTS

| | | |
|---|---|---|
| GB | 2 362 841 | 12/2001 |
| WO | WO 03/064932 A2 | 8/2003 |

* cited by examiner

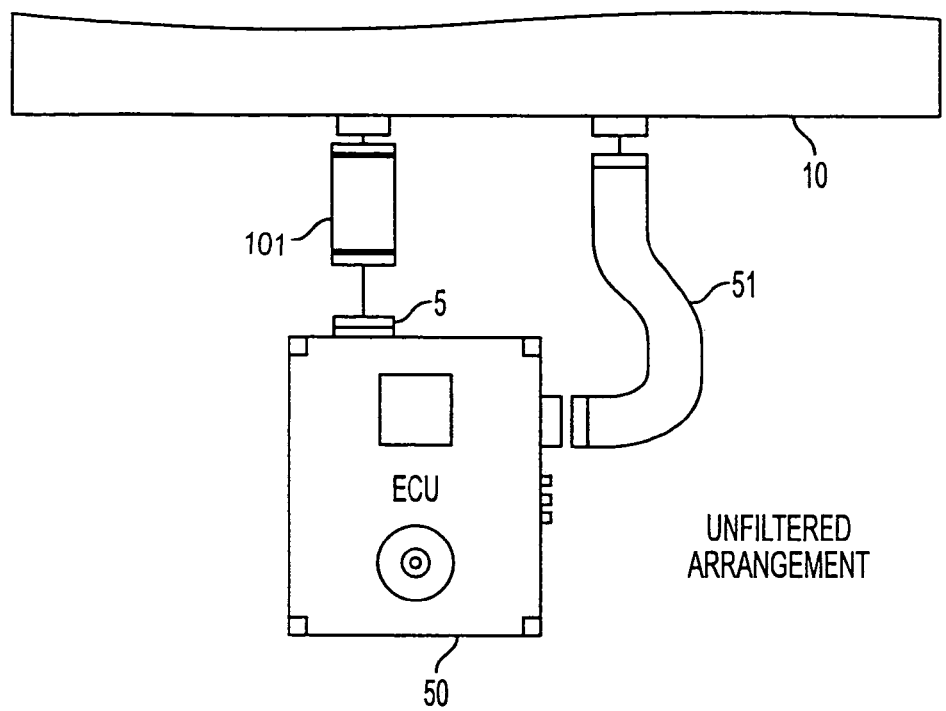
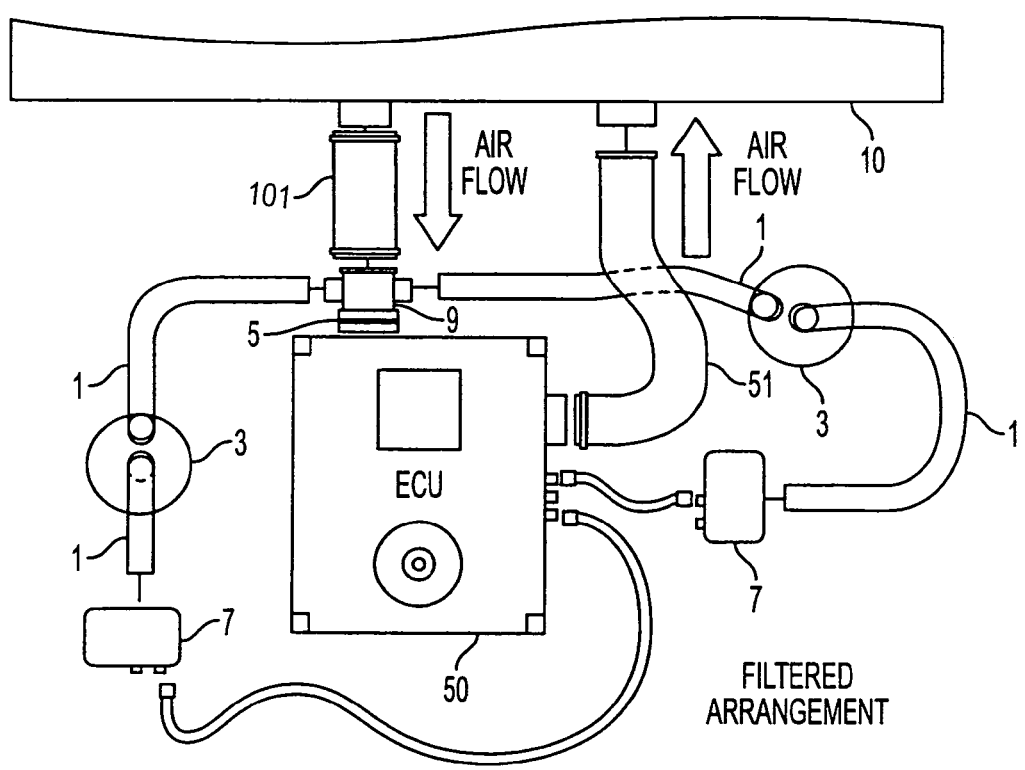
FIG. 1B
PRIOR ART

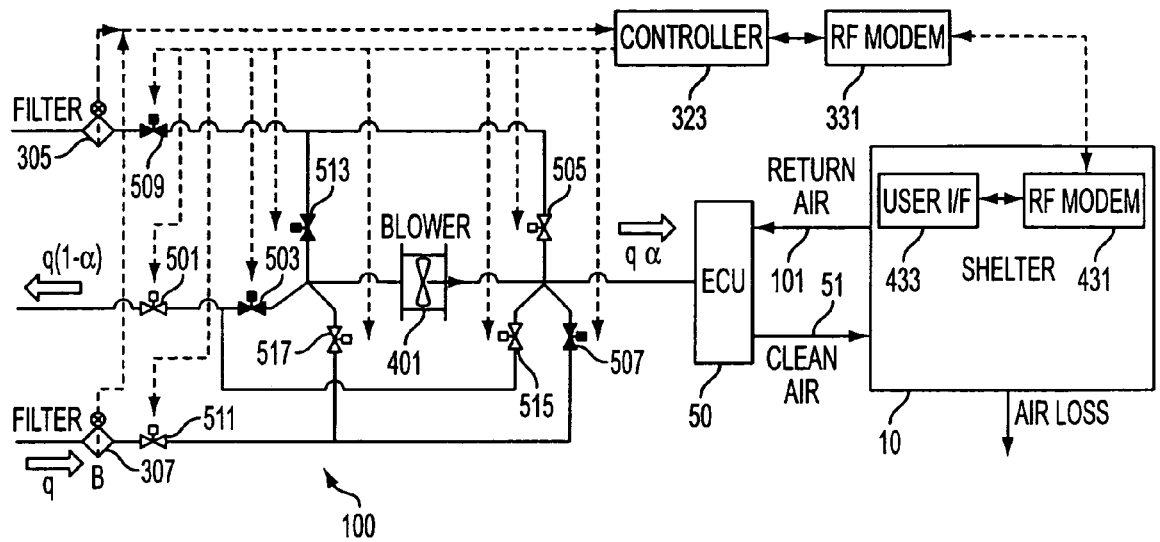

FIG. 7

| MODE | VALVE | | | | | | | | |
|---|---|---|---|---|---|---|---|---|---|
| | 509 | 501 | 511 | 513 | 503 | 517 | 505 | 515 | 507 |
| NO CONTAMINATION | × | o | × | × | o | × | o | × | o |
| CONTAMINATION, USING FILTER A | o | × | × | o | × | × | × | o | o |
| CONTAMINATION, USING FILTER B | × | × | o | × | × | o | o | o | × |
| CONTAMINATION, USING FILTER A, PURGE FILTER B LINE | o | × | o | o | × | × | × | o | o |
| CONTAMINATION, USING FILTER B, PURGE FILTER A LINE | o | × | o | × | × | o | o | o | × |
| NO CONTAMINATION, USING FILTER A, PURGE LINE | o | o | × | o | × | × | × | o | o |
| NO CONTAMINATION, USING FILTER B, PURGE LINE | × | o | o | × | × | o | o | o | × |

LEGEND -
o VALVE OPEN   × VALVE CLOSED

FIG. 8

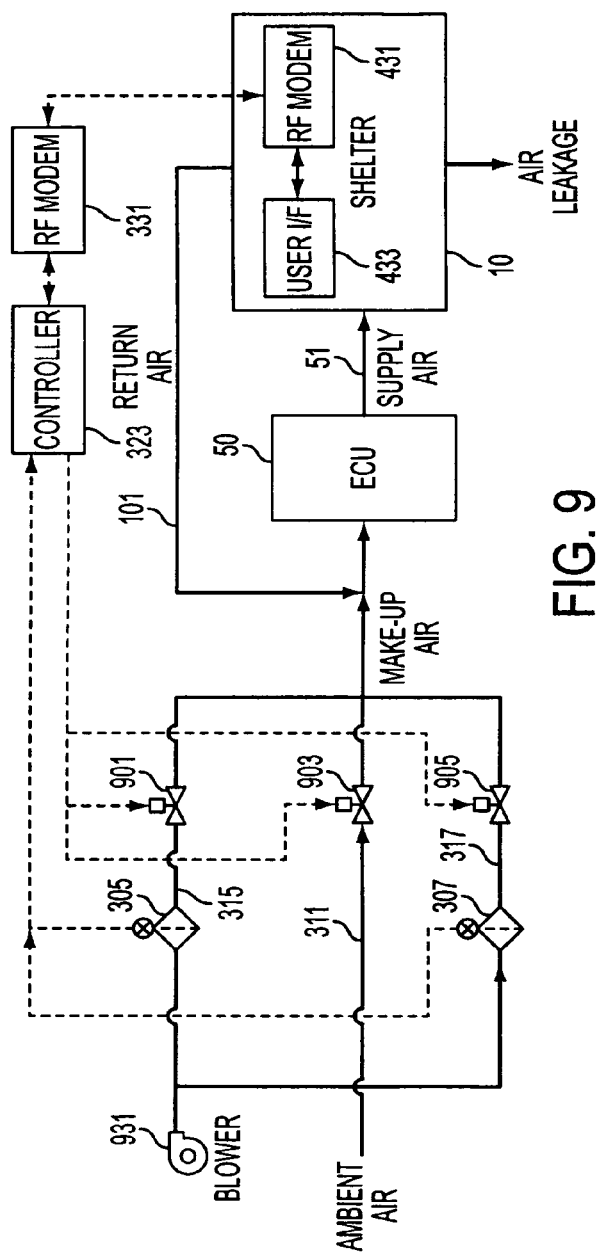
FIG. 9
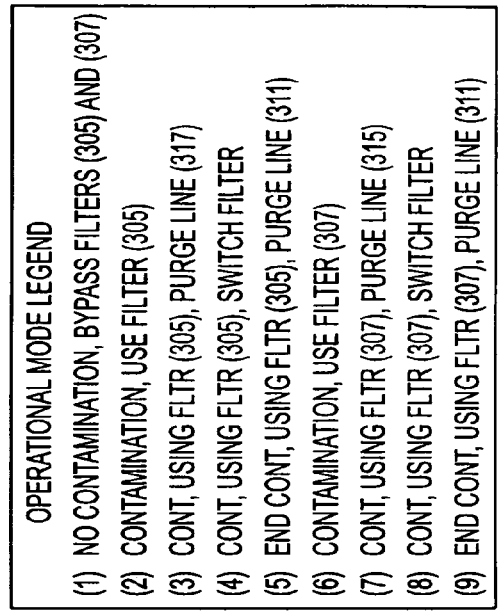
OPERATIONAL MODE LEGEND
(1) NO CONTAMINATION, BYPASS FILTERS (305) AND (307)
(2) CONTAMINATION, USE FILTER (305)
(3) CONT, USING FLTR (305), PURGE LINE (317)
(4) CONT, USING FLTR (305), SWITCH FILTER
(5) END CONT, USING FLTR (305), PURGE LINE (311)
(6) CONTAMINATION, USE FILTER (307)
(7) CONT, USING FLTR (307), PURGE LINE (315)
(8) CONT, USING FLTR (307), SWITCH FILTER
(9) END CONT, USING FLTR (307), PURGE LINE (311)
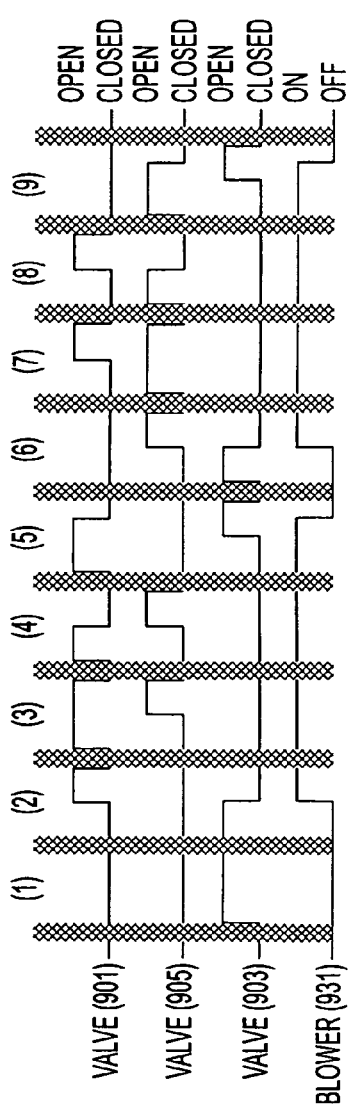
FIG. 10

NBC FILTRATION UNIT PROVIDING UNFILTERED AND FILTERED AIR PATHS

CROSS REFERENCE TO RELATED APPLICATION(S)

This application claims priority to U.S. Provisional Patent Application Ser. No. 60/444,072, filed Jan. 31, 2003, the entire disclosure of which is herein incorporated by reference.

BACKGROUND OF THE INVENTION

1. Field of the Invention

This disclosure relates to the field of filtration for environmental control units (ECUs). Particularly to filtration units for providing an isolated environment from Nuclear, Biological, or Chemical (NBC) contamination for use with portable ECUs which preserve filter life when NBC filtration is not needed.

2. Description of the Related Art

In recent years the need to segregate individuals from dangerous substances in the air has become one of increasing interest. All human beings must breath and the introduction of airborne agents to the air they inhale creates a dangerous situation whereby individuals can be killed or injured and can strain medical response capability in an area. While all environmental air contains some impurities which can harm those breathing it, such as cold viruses and pollutant molecules, modern warfare, terrorism, technology changes, and increasing globalization have led to an increased likelihood of larger scale contamination of air wherein sources of clean air can become quickly necessary to prevent catastrophic outcomes.

The danger of a chemical, biological or nuclear weapon being unleashed on military forces, or on civilian centers, is a nightmare scenario for many government organizations. Such an attack can stimy military effectiveness, or bring day to day economic activity to a grinding halt. Even without the purposeful use of nuclear, biological, or chemical weapons, the possibility of accidents involving these agents in populated areas is also a danger and governments must be able to respond to protect the citizenry. Still further, increases in globalization have led to increased danger of communicable disease. The recent Severe Acute Respiratory Syndrome (SARS) outbreak and fear of other dangerous natural contagions transmitted in the air has dramatically highlighted the need for governments and emergency response agencies to be able to quickly provide safe working conditions for health workers and other emergency responders to deal with contaminants, whether natural or man-made, whenever and wherever may be necessary.

The need to provide safe air supplies is one which tends to come upon a population suddenly. The need may be predicted, or an increased risk may be known to be likely such as when military operations are occurring against a government known to possess nuclear, biological, or chemical arsenals, but generally the threat is only realized once the contaminant is present.

Generally, protection against contamination requires the ability to either provide air which is known to be safe and has been stored for use during the period of contamination, or to filter air which is contaminated to remove the contamination and provide safe air. The use of stored air is generally less effective as the storage requires specialized tanks and processes, and generally the amount of air which can be stored is relatively small. Instead, filtration is generally used, particularly if one is attempting to provide safe air to a group of individuals.

Filtration for harmful contaminants generally works by filtering out any of three classifications of contaminants. These are nuclear, biological, or chemical (NBC) threats. NBC filters serve to reduce concentrations of nuclear particulates, organisms, and chemicals to levels where their concentration is no longer harmful, or in the worst case, no longer debilitating.

Larger isolation structures which can house multiple individuals are often the preferred method of providing safe air to groups of individuals. Isolation structures can have economies of scale for NBC filtration where larger more powerful air intake devices can be used to supply air to the structure. Further, a structure can allow individuals therein to perform tasks as they normally would instead of being forced to work in cumbersome individual protective suits.

Isolation structures may be permanent or may be temporary. In emergency responses or military field activities, a temporary structure is generally preferred as it can be quickly setup anywhere when needed, and more easily stored when not needed. Often the temporary structure is inflatable whereby the structure can be setup in the zone of contamination and can then be filled with clean air using a portable filtration system, the air providing the shape to the structure. Once inflated, the structure will be able to provide a safe haven for multiple people and a staging point for the use of contamination suits to venture further into a contaminated area. Further, the structure can be provided with more effective heating, cooling, or other environmental modification.

For many of these temporary structures, the environment inside the structure is maintained using an environmental control unit (ECU) (50) such as that shown in FIG. 1A. The ECU (50) is generally portable (generally being vehicle or pallet mounted) and serves to provide air to the inside of the structure. In order to provide safe air into the structure, the ECU (50) generally needs to be able to pump in dirty air and filter it or be provided with safe air at intake (5), and then pump the air into the structure. Traditionally, on a portable ECU (50), the filter (3) was a separable component which could be placed in the incoming air path of the ECU (50) to filter the air if necessary. In this way, the isolation structure (10) could be set up and used in a safe area without need to install the filter (3) on the intake if filtered air was not required. If the threat of NBC contamination was present, the same air intake could be modified to include a filter and provide filtered air. Both such options are shown in FIG. 1B.

This design, however, has a major limitation. If the system is used where there is an ever present threat of contamination, but the contamination is either not constant, or is unknown, the filter (3) must be placed in the air path at all times in order to be safe. Because of current limitations, it has proven difficult to measure the effective life of a filter (3) in operation without knowledge of the environment that the filter (3) is filtering. Further, changing the filter (3) generally requires a potentially hazardous operation, and the filter setup is also much more complicated, as shown in FIG. 1B, than the non-filter setup. In the filter setup, multiple additional hoses (1) and the filter (3) and blower units (7) must be attached to the intake (5) using a special adapter (9) to allow for shelter air to be recirculated with make-up air brought in from the filters (3).

Because of the necessity to operate the ECU (50) with the filter (3) in place during a threat, even if the actual danger is not continuous or does not materialize, the operation of the structure (10) uses up filters (3) at an increased and unnecessary rate. As a filter (3) is always in use, the remaining useful life of the filter (3) is not actually known. The amount of threat filtered, and the amount of other filter (3) degradation, cannot be accurately determined. Therefore a "safe" estimate is used whereby the filter (3) is replaced based on its time in operation regardless of what it actually filtered. This leads to unnecessary work, the disposal of filters (3) which still have operational life, and an increased cost to both build and transport filters (3). Still further, as a filter (3) necessarily creates air resistance, and a system operating with an unnecessary filter (3) in place wastes energy to pull in air. An additional problem is that if the system is setup in anticipation of a potential danger which does not materialize, the filter (3) may have to be disposed of after a use due to filtering out other containments which are not particularly dangerous or because of lack of knowledge of the load on the filter (3) during its operational time. This can lead to the filter changing operation having to occur during the time when the filter (3) is actually needed.

NBC filters for ECU filtration are part of the significant logistic trail in both military and civilian collective protection and can also be a significant expense. To date, there is no production system that incorporates a method to measure the absorbent level of the carbon bed used in most filters. In the absence of this, protocol dictates that the filter (3) be changed more frequently than needed when it is in use. Each change of filter (3) requires personnel to leave their protected environment and to manually change the filter (3). As well as being a tedious task, it offers the possibility that the filter (3) might not seat correctly, leaving the system potentially at risk and the danger that personnel may be exposed while outside the shelter.

One proposal to attempt to deal with the need to change filters (3) are regenerative filtration systems whereby the filter can be remotely cleaned. There are numerous different types of these proposed such as pressure swing, temperature swing, electronic swing and hybrid systems thereof. Regenerative filtration systems, while effective, are bulky and consume more power and, hence, are only useable in certain applications. In other structures, particularly those where the ECU must be easily portable and the shelter is temporary, or those where the cost of a regenerative filter based on its time of expected use (e.g. such as for civilian emergency preparedness for threats such as a biological terrorist attack) leads to them being uneconomical, disposable filters are superior choices.

SUMMARY

Because of these and other problems in the art, described herein are Environmental control units (ECUs) and filtration units which can provide for remote swapping of filters by individuals within the associated structure without them having to leave the structure. Filtration units are described which operate in conjunction with an existing ECU and which utilize multiple air flow pathways to provide for improved filter utilization and efficiency by supplying different levels of filtration (including no filtration) to preserve filter life based on the current use and occupancy of the structure. Still further, there are described filtration units which include mechanisms to monitor outside conditions to more accurately determine actual filter use and when filters need to be replaced. This makes estimates of useful lifetime correspond more accurately to the filter's actual use.

Described herein, in an embodiment, is a nuclear, biological, and chemical (NBC) filtration unit for use with a portable environmental control unit (ECU) comprising: a first air flow path wherein air passes through the filtration unit and to the ECU without the air passing through an NBC filter; a second air flow path wherein air passes through the filtration unit and to the ECU through an NBC filter; and a controller allowing the filtration unit to switch from passing air through the first air flow path to the second airflow path and from the second air flow path to the first air flow path repeatedly without the NBC filter being removed from the filtration unit.

In an embodiment, the switching between the first air flow path and the second air flow path may be performed without human intervention or commanded by a human operator at a remote location such as, but not limited to, inside a shelter utilizing the ECU for environmental control using a wireless technology such as Bluetooth™.

In an embodiment, the filtration unit further includes a third air flow path wherein air passes through the filtration unit and to the ECU through another NBC filter and the controller can switch freely between the first, second, and third air flow paths wherein the second air flow path and the third air flow path may be generally symmetrical, the NBC filter in the second air flow path need not be changed when it has reached the end of its useful life as the controller may switch to the NBC filter in the third air flow path, air flow may be switched from the second air flow path to the third air flow path without any unfiltered air being provided to the ECU, each of the second and the third air flow path includes a blower, or further including an inlet manifold and a blower wherein the inlet manifold allows the blower to direct the air down either the second or the third air flow path which may allow the blower to direct the air down both the second and the third air flow path simultaneously.

In another embodiment, the NBC filter comprises a deep active carbon bed filter, the first air flow path includes a filter which is not an NBC filter, the ECU is a field deployable ECU (FDECU) or light ECU (LECU) as used by the United States military, air is at least partially pulled through the first air path by a blower in the ECU, or air is at least partially pushed through the NBC filter by a blower in the second air path.

In another embodiment there is described a method of providing filtered air and unfiltered air to an environmental control unit comprising: having a filtration unit having at least two air paths and a controller; flowing air through a first of the at least two air paths and through a nuclear, biological and chemical (NBC) filter; allowing the controller to switch the air flow from the first of at least two air paths to a second of the at least two air paths; flowing air through the second of the at least two air paths and not through an NBC filter; allowing the controller to switch the air flow from the second of the at least two air paths to the first of the at least two air paths; leaving the NBC filer in the first air path in both the steps of flowing.

In a still further embodiment, there is described, a filtration unit comprising: means to force air through a first air flow path; means to force air through a second air flow path; and means to select which air flow path air is flowing through; wherein the first air flow path does not provide NBC filtered air; and wherein the second air flow path provides NBC filtered air.

BRIEF DESCRIPTION OF THE FIGURES

FIG. 1B shows two block diagrams of the ECU of FIG. 1A setup in both an unfiltered and NBC filtered arrangement.

FIG. 3 Shows a block diagram of embodiments of a filtration unit having three air paths and showing the air flow pathways. The embodiment of FIG. 3A includes an inlet manifold utilizing a singular intake while

FIG. 7 Shows a schematic diagram of the valve position in an embodiment of a filtration unit having three air paths when contamination is determined to no longer be present and the system is being cleared prior to returning to the operation of FIG. 4.

FIG. 8 Shows a table of valve positions for various different modes of operation of the of the valves in the embodiment of the filtration unit shown in FIGS. 4-7.

FIG. 9 Shows a schematic diagram of valve positions in an embodiment of a filtration unit utilizing an inlet manifold and a single push blower.

FIG. 10 Provides a chart showing valve positioning and blower control for various states of operation of the embodiment of FIG. 9.

DESCRIPTION OF PREFERRED EMBODIMENT(S)

Disclosed herein, among other things, are embodiments of a filtration unit (100) which provides for at least two different air flow pathways. The filtration unit (100) is principally designed to be used with a portable environmental control unit (ECU) particularly a Field Deployable ECU (FDECU) or a Light ECU (LECU) as used by the United States military. At least one of these air flow pathways does not include a nuclear, biological, and chemical (NBC) filter for filtering incoming air. The system is principally designed for flexibility and ease of operation. In particular, operations of changing filters are generally decreased from standard ECUs having only a single air path so that there is a decreased need for personnel to change filters, filter life is generally preserved by not unnecessarily utilizing filters, there is generally an increase in reserve capacity, and filter setup is a generally simplified procedure.

This disclosure will principally talk about air flow pathways whereby some pathways provide filtered air and others provide unfiltered air. For purposes of this disclosure, a filter used to filter air for this purpose will be a disposable nuclear, biological and chemical filter (NBC filter) generally comprising a deep active carbon bed as is known to those of ordinary skill in the art. One of ordinary skill in the art would recognize, however, that there are other types of single-use disposable NBC filters which may be used instead of a deep active carbon bed filter and may be substituted for the deep active carbon bed NBC filter discussed herein. One of ordinary skill in the art would also recognize that there are other forms of filters (such as dust filters) which still filter air but do not serve as NBC filters. For the purposes of this disclosure, "filtered air" is air which has passed through an NBC filter. "Unfiltered air" may have passed through a filter which does not function as an NBC filter, but has not passed through an NBC filter.

Figure 1A:
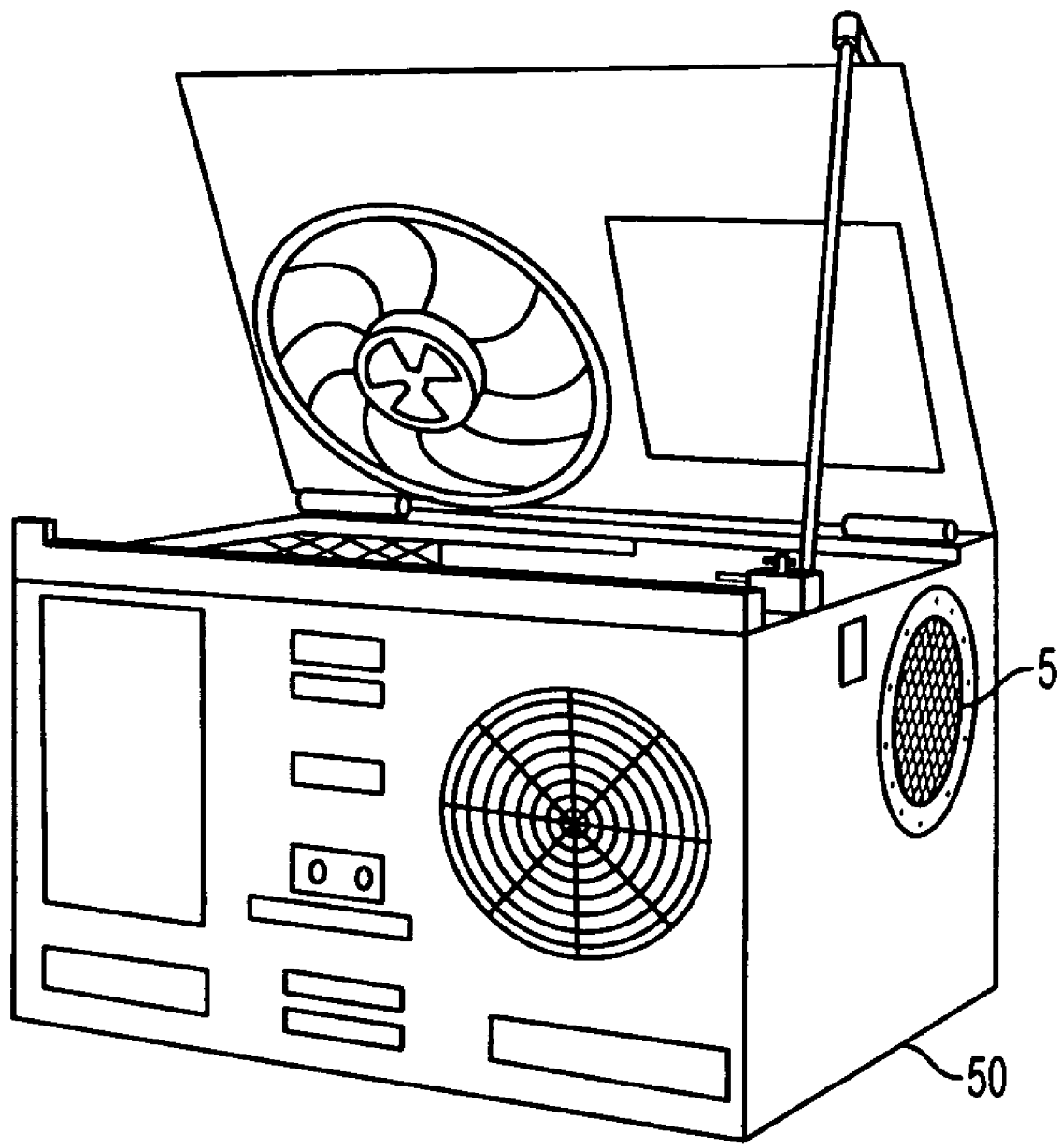
FIG. 1A Shows a perspective view of an ECU of the prior art.
Figure 2:
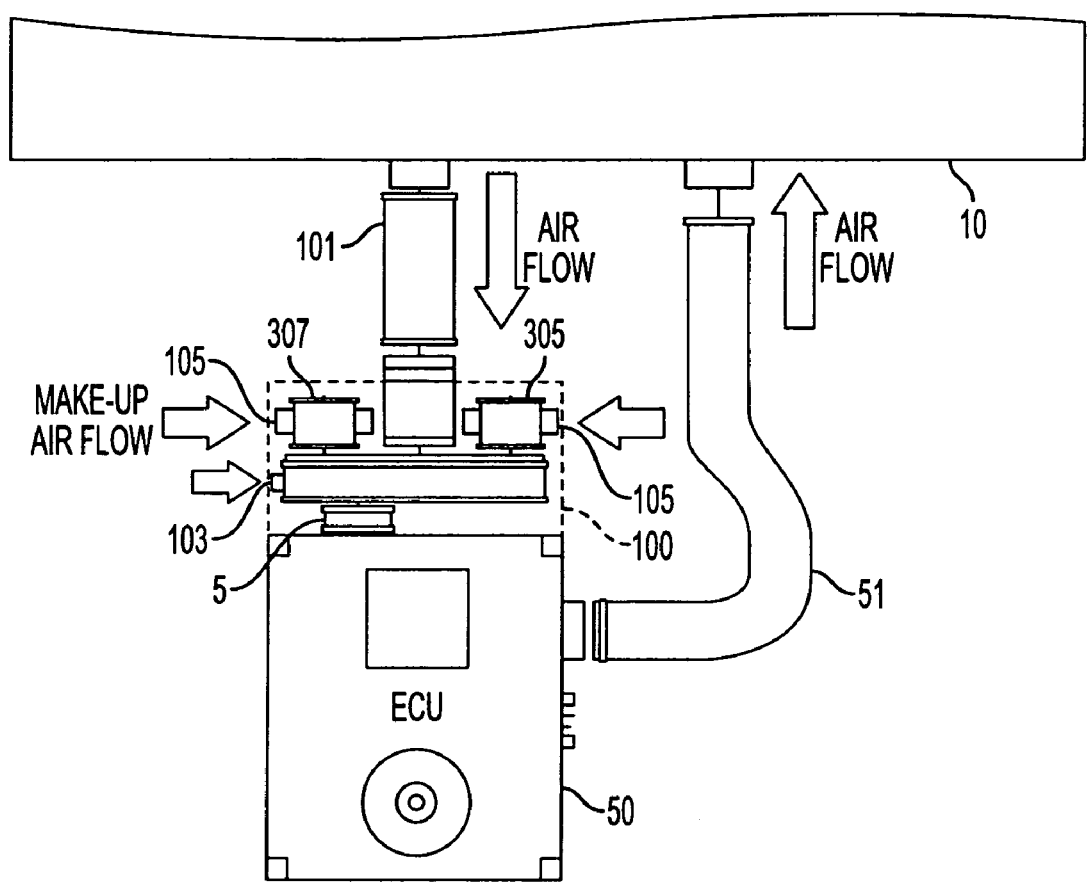
FIG. 2 Shows a diagram of an ECU with an attached filtration unit comprising an embodiment of the invention and having three air paths.

FIGS. 2 and 3 provide for a general overview of embodiments of a filtration unit (100) utilizing three air paths and comprising an embodiment of the invention. In this system, the filtration unit (100) is used in conjunction with an ECU of the prior art (50) (as shown in FIG. 1) by adapting an air output of the filtration unit (100) to the existing intake (5) of the ECU (50). In an alternative embodiment, the filtration unit (100) may be integrally incorporated into the ECU (50) forming a filtration ECU unit (not shown). The separable design is, however, preferred for many applications as it does not require transport of the filtration unit (100) unless filtration is expected to be required in conjunction with the ECU at some time.

Attached to the filtration unit (100) is an input hose (101). This input hose (101) may take in air from the shelter (10) to be recycled through the filtration unit (100) or provided back to the ECU for environmental modification. The air taken in may be cycled to help improve environmental control or for any other reason why air recirculation may be desired. In a preferred embodiment, this recycled air is not filtered but is brought in through the filtration unit (100) by pull from the intake fan (not shown) of the ECU (50). The filtration unit (100) will also be able to take in air from the environment (make-up air). This may be via the same input hose (101) or via another air intake and will serve to replace air lost by the shelter (10) or to maintain air pressures.

Generally, recirculated air and make-up air will be mixed together after filtration. The make-up air may come in via an unfiltered intake (103), or a filtered air intake (105). The make-up air may be pulled in via the ECU fan or blower; however, in a preferred embodiment, each filter (305) and (307) has a blower (fan) associated with it to improve air pressure and throughput through the filter (305) or (307). These fans are preferably on the dirty side of the filters (305) and (307) to push dirty air into the filter (305) or (307) while the ECU fan serves to pull clean air from the filter (305) or (307). In an alternative embodiment, a single blower may work in conjunction with a manifold to push air into the system. In this case there may only be a single air intake (107) for both air to be filtered and not filtered.

There is an output hose (51) connected to the air output of the ECU (50). The ECU will obtain clean air from the filtration unit (100) via the ECU's air intake (5). The ECU may mix the new clean air and the recycled shelter (10) air together, if not already completed by the filtration unit. It will then condition (heat or cool) or otherwise modify the air as necessary and pump the resultant air through the output hose (51) and into the shelter (10) to provide air in the shelter (10). The connection between the ECU (50) and filtration unit (100) will preferably be sealed so that no contaminated air could be introduced between the two systems. The shelter (10) is preferably sealed to the outside air other than air provided through the ECU (50) and filtration unit (100) to prevent any contamination being allowed into the shelter (10).

Figure 3A:
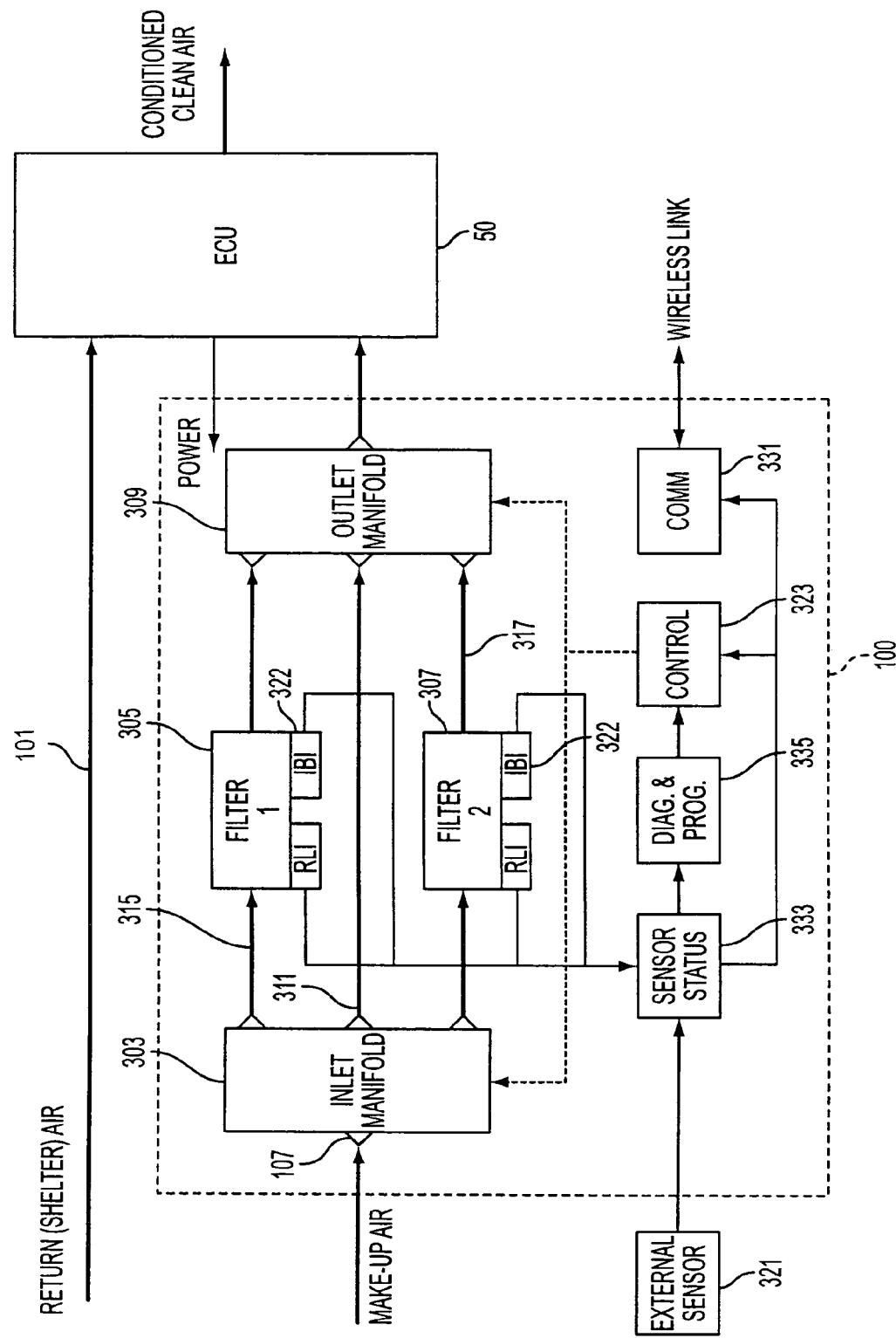
Figure 3B:
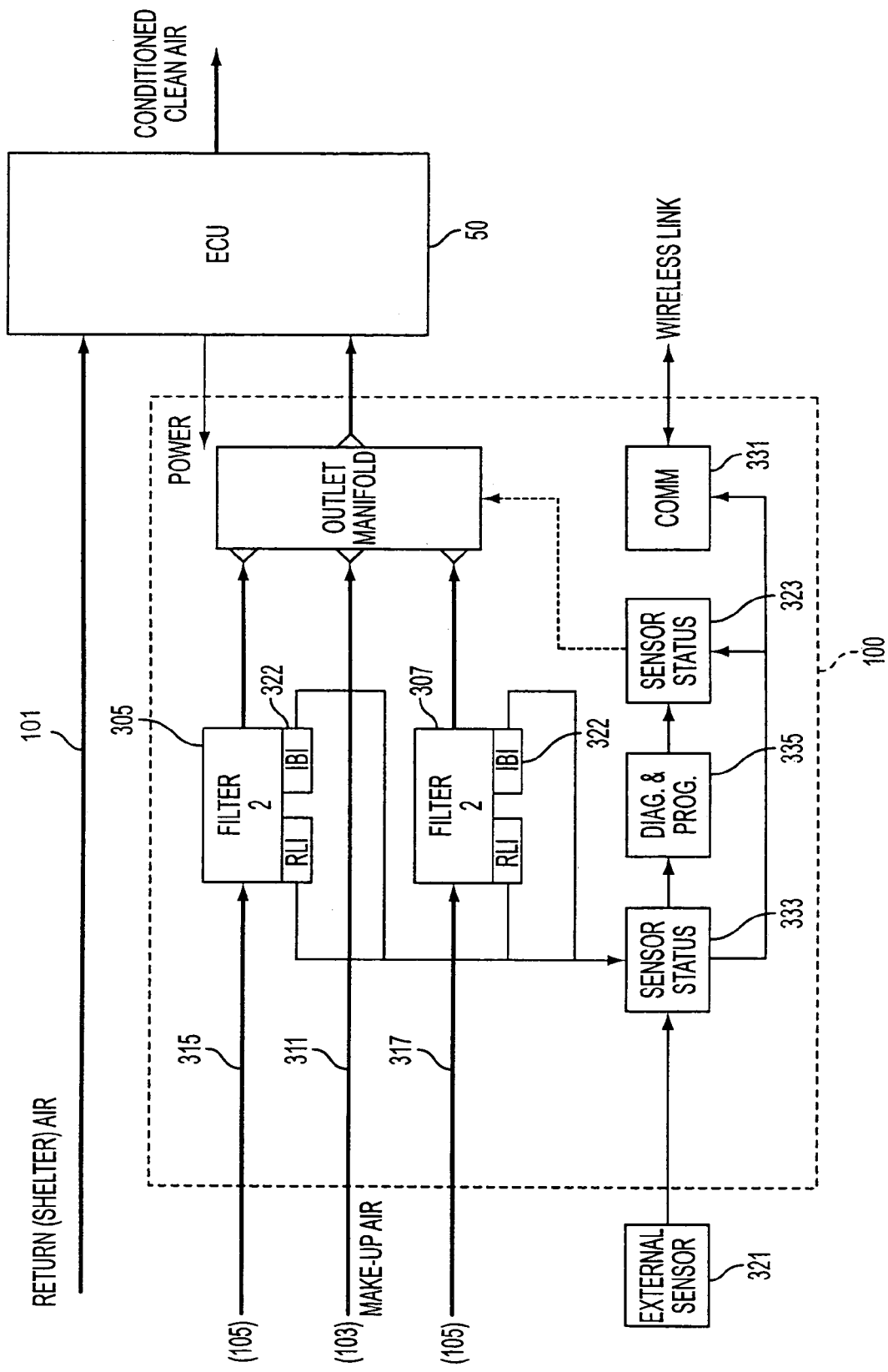
FIG. 3B shows an embodiment which does not have the manifold and uses separate intakes.

FIGS. 3A and 3B provide general block diagrams of the arrangement of components of embodiments of a filtration system (100) and showing the different air pathways for different operation of the filtration system (100). There is a connection to the outside air and/or recirculated air which allows the air to flow into the filtration unit (100). Depending on the embodiment, there may be a valve arrangement prior to the filters (305) and (307). In the embodiment of FIG. 3A, an inlet manifold (303) is the initial valve control which determines the air path down which the input air (dirty air) is sent after it comes in an air intake (7). The inlet manifold (303) may include a fan or blower or may direct a single fan or blower in the intake (107) to push air into the selected filter (305) or (307) in use or into the unfiltered path (311). A portion of the inlet manifold (303) may also serve as an exhaust if necessary or desirable based on the mode of operation. The input manifold (303) has three potential air paths as outputs, two air paths (315) and (317) pass the air through at least one NBC filter (305) or (307) and then into the outlet manifold (309). The third air path (311) does not pass the air through an NBC filter, but allows for unfiltered air to be passed into the shelter. In FIG. 3B, the inlet manifold is eliminated and a blower/fan is generally placed in each filter path (315) and (317). The unfiltered path may rely on the ECU fan or also have a dedicated fan. There are also shown different intakes for the different paths. Intake (103) is used for unfiltered air, intake (105) for filtered air.

The outlet manifold (309) is generally connected to the ECU (50) where the air will pass before being provided to the shelter (10) in order to be conditioned. One of ordinary skill in the art would recognize that the ECU (50) being a separate unit is not required and the functions of the ECU (50) (generally heating and cooling) can be provided as an integrated part of the filtration unit (100).

As shown, the newly acquired air is offered three paths in both embodiments of FIG. 3. The path (311) bypasses both filters (305) and (307). This path is preferably only established when power is available to the filtration unit (100), to allow for switching from this path if necessary, and serves to preserve the life of the NBC filters (305) and (307).

In the depicted embodiment, operation of the filtration unit (100) and selection of the airway path is selected by a controller (323) included within the filtration unit (100). The controller (323) will generally be a digital processor or other electronic control which can take in input from a variety of sources, determine an appropriate arrangement of components in the filtration unit (100), and implement that course of action. In the depicted embodiment, the controller (323) will take input from three sources, an external sensor (321), internal sensor (322), and associated sensor electronics (333); a diagnostic system (335); and a human communication channel (331).

In the depicted embodiment, the external sensor (321) is located external the filtration unit (100) and in the environmental air to provide for indications of when it is safe to use the unfiltered air path (insufficient contamination is detected to pose a significant risk). In a preferred embodiment, this sensor (321) will constantly monitor the outside air. In an embodiment, the use of path (311) will be prohibited automatically unless the sensor electronics (333) indicate to the controller (323) that the outside air is safe. In particular, the default air path will be a filtered path so that if power is cutoff or the sensor (321) fails, the system acts in a failsafe mode defaulting to an NBC filtered path (315) or (317).

In another embodiment, the sensor (321) will act to provide the signal to automatically change between the unfiltered path (311) and one of the filtered paths (315) and (317) depending on what it detects. In this way, a change in environmental air contaminant levels can immediately trigger protective measures by imposing an NBC filtered path on the air, or can provide for safe air without filtration to prolong filter life once a danger has passed.

Internal sensors (322) may monitor filter status or filter connection to determine if the filtered paths are operating safely. The internal sensors (322) may determine that a filter is incorrectly installed, that a filter's effective life is exhausted, or the air flow through a filter, among other things.

The operation of the filtration unit (100) to select a path allows for more efficient operation of the filtration unit (100) when there are periods of safety and danger alternating during a particular time. In particular, the system can be allowed to operate on a totally automatic control relying on the sensors (321) and (322) to switch to a filter mode when danger is detected. It would be apparent, that the danger mode or indication may be based on a variety of factors one of which may be the use to which the shelter is placed. For instance, if the shelter is being used for medical care, the threshold of "unsafe" air may be placed lower as those inside may have a decreased ability to fight off any contamination than if the building is housing healthy individuals.

The controller (323) may also be able to understand the use level based on the filter load or other known activity taken by the system outside of the readings from sensors (321) and (322). This may include time-in-use determinations and other such factors. For instance, in an embodiment, if the system detects increasing levels of contaminant, but the filters are close to the end of their useful life, the controller (323) may provide unfiltered air until the level of contaminant has reached a higher level than normally it would (but still a safe level) so as to preserve filters which may otherwise need immediate replacement at the worst time of contamination. In the same way, the controller (323) may be informed that nobody is currently inside the shelter, and may allow the inside air to become contaminated to preserve filter life, or may shut off air flow entirely to seal the structure without having to provide fresh air which is not needed.

In an alternative embodiment, the filter path may be switched on command regardless of the sensor (321) operation (which serves more as an indicator) or in conjunction with sensor (321) operation. For instance, if personnel learn that filtration has become necessary, personnel may command the filtration unit (100) to change to a filtered air path even if the sensor (321) has not detected danger. Alternatively, the sensor (321) may detect a danger situation, but personnel may chose to ignore the risk as they may have additional information saying that the sensor (321) is malfunctioning. In a preferred embodiment, a control command is sent by those inside the shelter (10) utilizing a control unit (433) in the shelter (10) so that they can remain safely inside the shelter (10) during any human-assisted transition. In this way, those utilizing the shelter (10) can quickly react to a changed circumstance and maintain a safe air supply in the shelter (10), without anybody having to leave the shelter (10) to switch the air path between unfiltered and filtered air paths.

In an embodiment, the control unit (433) commands may utilize a wireless link (431) from a control unit (433) placed inside the shelter (10) to the communications link (331). The basis of the communication is preferably the 2.5 GHz Bluetooth™ protocol or radiofrequency communication but any form of wireless communication or protocol may be used. In a still further embodiment, a wired connection may be used between the control system (323) and the control unit (433), but this is less preferred as it may introduce weak points or fail points where the integrity of the shelter (10) can be more easily compromised.

The control unit (433) inside the shelter (10) may act as a human interface between the controller (323) and the human occupants. The shelter (10) may also provide indications of the values obtained from the sensor (321) or (322) systems or the diagnostic system (335) from the controller (323) to those inside the shelter (10). It may also serve as an indicator of potential situations as well as the status of the system as a whole. Further, the control unit (433) inside the shelter (10) may control other functions of the shelter (10) (such as the ECU(50)) to provide for easy monitoring of the shelter (10) and control of all facets of the air. In conjunction with diagnostic system (335), the operator may also be able to perform remote maintenance on the filtration unit (100) from the control unit (433) or test the filtration unit (100) remotely and isolate a problem before having to venture out to perform repairs.

The controller (323) receives a command from the human operator at the control unit (433) via communications link (331). The controller (323) can utilize this command as an override, or may use it in conjunction with the sensor status (333) and diagnostic (335) systems. As an override, the controller (323) will simply switch to the commanded path. If used in conjunction with other information, the controller (323) may make logical selections based on what it knows of the system. For instance, the controller (323) may have detected from the sensor (322) that there is no filter currently installed in path (317), therefore when the user requests switching from unfiltered path (311) to filtered path (317), the controller (323) may instead switch to filtered path (315) presuming that a filtered path is desired. Alternatively, path (315) may have a partially used filter (305) which will best be used up before exposing a new filter (307) to contaminants which may require the replacement of both for safety so the system may switch to path (315) instead of path (317) when a filtered path is requested by the user. In a still further embodiment, the controller (323) may operate in a manner of failsafe so that in default filtered air is provided unless there are affirmative indications of safety. For instance, the controller (323) may ignore any request sent from the control unit (433) in the shelter (10) to switch to an unfiltered path if the sensor (321) is currently detecting contamination. The controller (323) may also be networked with other controllers (323) or other shelters' (10) control units (433) to provide for additional information.

The two filtered paths (315) and (317) are preferably symmetrical and can be used interchangeably. The availability of at least two filtered paths (315) and (317) is preferable because it allows for an increased operational time without need for filter changing operations. The more filtered paths that are available allows for increased switching between filters without need to shut off intake air or provide unfiltered air during the act of changing a filter. The selection of which particular path (315) or (317) is in use will generally depend on the situation. The selection may either be automatic or user selected. Further, the selected path may depend on the particular needs of the shelter (10), or the skills of a technician operating the system.

The operation of switching from one filter to the other filter may be used irrespective of whether the status of the first filter is known. What it allows is to select a fresh filter (or a used filter if that is desirable) and have it immediately operational. Further, this means that when a first filter has reached its safe capacity, the system can still be operated without need to immediately replace the filter. The "loaded" filter can be replaced at any time that is convenient. With the addition of a residual life sensor for detecting that the filter is approaching actual operational limits (or a simple calculation based on known life limits) this switching between filters can be automatically accomplished by the controller (323).

The filtration unit (100) provides for operation in both a non-threat environment, and a NBC contaminated environment. In the non-threat environment the airflow bypasses the NBC filters to prolong the service life of the filter cartridges. In a NBC contaminated environment, the airflow is directed through a filter to protect the personnel in the shelter (10) from the contaminant. At least one redundant filtered air flow path is preferably provided to extend the operational time without need of filter maintenance.

In the above discussion, the indication of there being three air flow paths is somewhat simplified from the actual paths the air may take, however it uniquely refers to the fact that outside air may go three different ways to reach the shelter (10). The actual path of air may be selected from a greater number of paths depending on if air is being split from that going to the shelter (10) or is not going to the shelter (10) at all. The three air flow paths may be selected from a path which avoids a filter from outside to shelter (10), a path which passes through a first filter from outside to shelter (10), and a path which passes through a second filter from outside to shelter (10). The actual path taken by the air may not be into the shelter (10) in particular operations or may be physically different while still being the same "air path." Further, the air may be both passed into the shelter (10) and exhausted (split between the two) for the same application.

As is shown in FIGS. 4-8, in an embodiment the selected air flow path is controlled by a series of valves, which are under the control of controller (323) and may be located in the inlet manifold (301) or, more preferably, outlet manifold (309). The controller (323) monitors and controls the position of the valves. In this way the controller (323) can recognize the current configuration of valves and, when there is a need to change, determine the desired outcome configuration of valves and then transition to that outcome in a manner that provides for safe operation. The status of valves and the course of a change, in an embodiment, may be presented to the end user via the control unit (433) inside the shelter (10), or may simply be performed automatically.

In an embodiment, even in an uncontaminated environment, a positive pressure is preferably maintained on unused lines at all times. This is accomplished in the embodiment of FIGS. 4-8 by bleeding off a portion of the airflow into the shelter (10), and feeding it into the unused lines. This helps ensure that contaminants are not introduced into the line during a transition from uncontaminated to contaminated air, or when switching from one filtered line to the other. Further, it can help prevent a buildup of stale air which could lead to a problem in the future.

Figure 4:
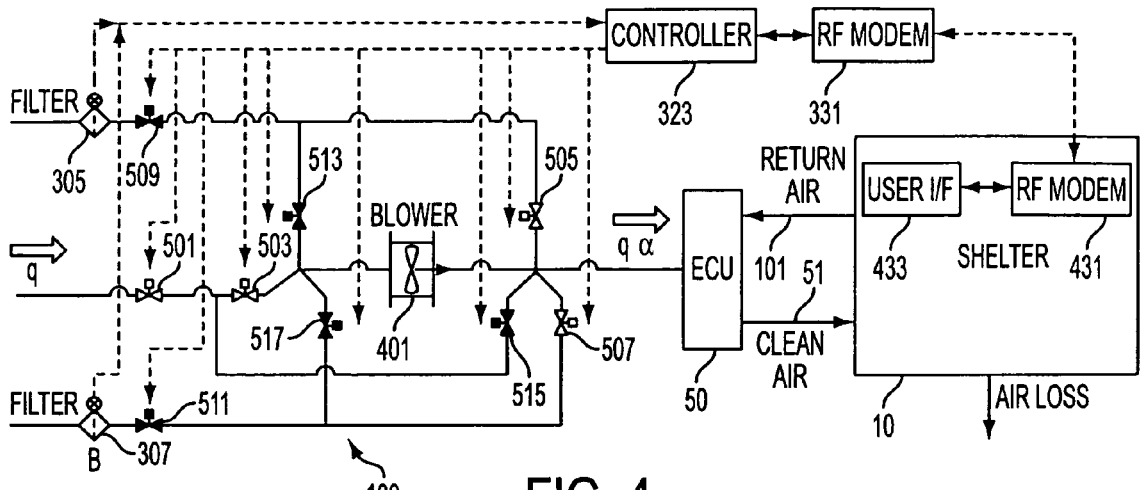
FIG. 4 Shows a schematic diagram of valve position in an embodiment of a filtration unit having three air paths operating in an uncontaminated environment in a manner to preserve filter life.

FIG. 4 shows the position of the valves under the normal mode of operation in an uncontaminated setting. Outside air is drawn by the blower (401) via valves (501) and (503), and forced into the shelter (10). The blower being located where it is has been done to be purely representative and may be positioned elsewhere in the system or replaced by multiple blowers as discussed previously. A portion of the airflow in this embodiment is directed toward valves (509) and (511) through valves (505) and (507) to maintain the positive pressure in the output of the filtered sections for the reasons discussed above.

Figure 5:
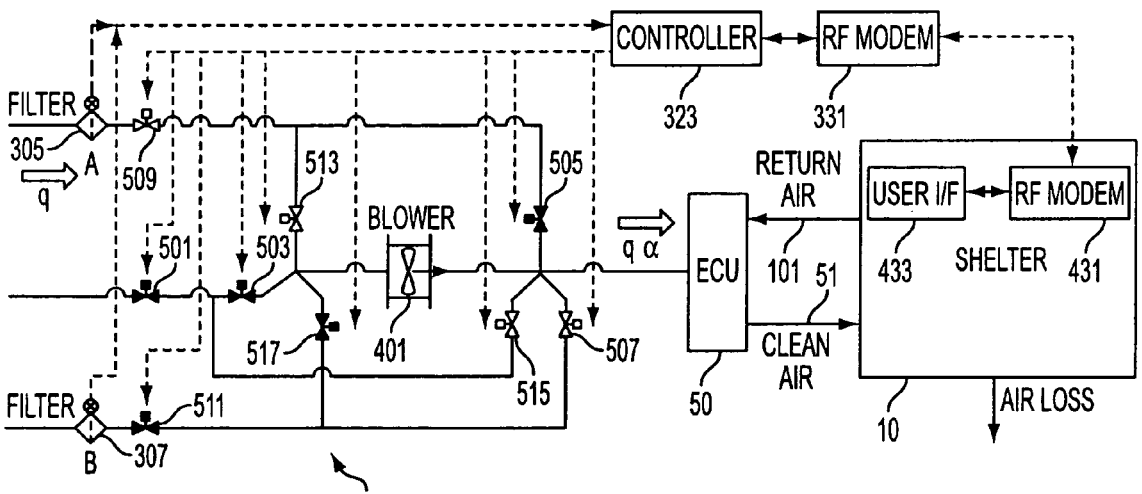
FIG. 5 Shows a schematic diagram of valve position in an embodiment of a filtration unit having three air paths operating in a contaminated environment using filter (305).

When the determination is made that filtration should be used, the controller (323) will switch the filtration unit (100) to a new configuration of valves and operate in that configuration. In FIG. 5, the valves are positioned to provide for filtration using filter (305). Outside air is pulled by the blower (401) into the filtration unit (100) via the filter (305), and valves (509) and (513). A portion of the airflow is diverted through valves (515) and (507) to maintain a positive pressure on the outlet side of valves (501) and (511). The blower (401) can then pull in clean air from the clean side of the filter and force that into the shelter. While filter (305) is in use, the controller (323) preferably also monitors the contaminant loading on the filter (305). The method for this monitoring may be any method known now or later discovered, such as, but not limited to a countdown timer which estimates the filter's useful life based on the amount of time that air flow path (315) has been in use, or a residual life detector mounted on the filter (305) to determine its actual filtration load. When the filter (305) is very near the end of its life (as determined by any method), the controller (323) can initiate a switch to the other NBC filter (307).

In order to switch from filter (305) to filter (307), valve (507) is closed, and valves (511) and (517) are opened. This begins airflow through filter (307). After this action, valves (509) and (513) are closed, and valve (505) is opened. A similar sequence of events (basically in reverse) takes place when switching from filter (307) to filter (305). This sequence is particularly desirable because it allows for switching without the possibility of contaminant being introduced into shelter (10). All air will pass through a filter before reaching the shelter (10) at all times in the transition.

Figure 6:
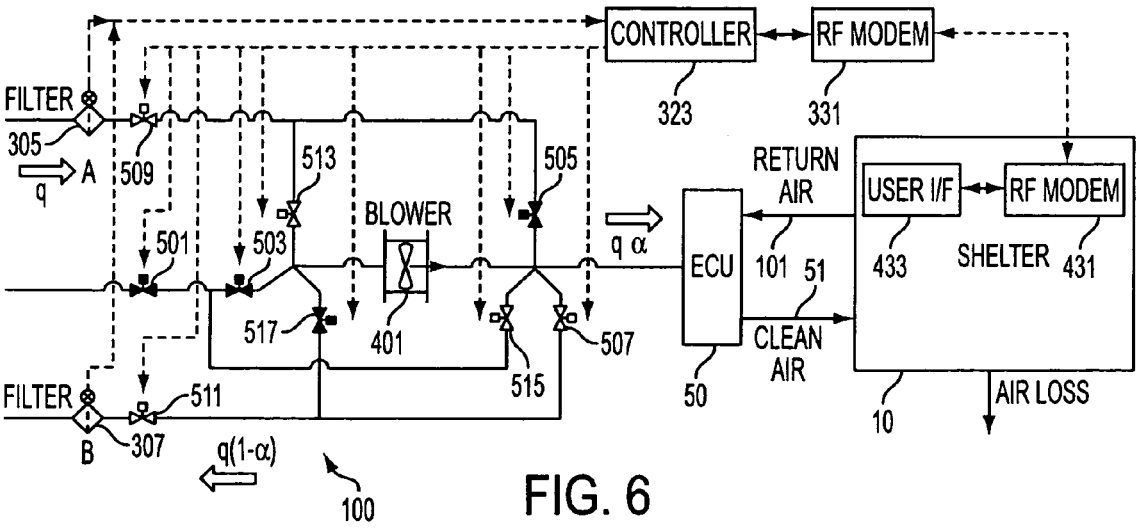
FIG. 6 Shows a schematic diagram of the valve position in an embodiment of a filtration unit having three air paths operating in a contaminated environment when filter (305) is in use and filter (307) is being replaced.

Eventually, it will become necessary to change (replace) at least one of the two filters. For instance, filter (305) may have reached the end of its useful life and the useful life of filter (307) is approaching. When it becomes necessary to change a filter cartridge, maintenance personnel will approach the filtration unit (100). They may need to be NBC suited for the operation, or more preferably it may be performed during a lull in contamination where the contaminant is not present in a sufficient quantity to present a risk in unfiltered air. The embodiment of FIG. 6 provides for a purge operation which may be performed during a filter change to prevent contaminant in the connection line during the filter removal operation. In order to perform the purge during the transition, the controller (323) preferably opens the filter outlet valve of the filter in question to purge the connection line to the filter, thus ensuring that no contaminants enter the line. FIG. 6 shows an embodiment of the position of the valves to perform this purge operation. In this case, filter (305) is in use, and it is necessary to change filter (307). Note that the positions are identical to those of FIG. 5, except for valve (511) being open.

When changing filter (305) while filter (307) is in use, a similar arrangement to FIG. 6, but with the arrangement discussed above for switching to filter (307) would be used. In a preferred embodiment, it would be possible for personnel to replace both filters in a single operation by replacing one immediately followed by replacing the other. This results in a dramatic decrease in the need for personnel to suit up in NBC suits, go outside the shelter, perform work, and then be decontaminated to return. In particular, when one filter has reached the end of its useful life and the other is approaching it, the maintenance person would first replace the filter which has been used up, providing a new filter. Once that filter is installed, they can have the controller switch to the new filter (checking along the way that the filter is seated correctly and so forth). Once the new filter is in use, the individual can replace the second filter which is effectively depleted. Once that filter is installed and checked they can return to the shelter (10). The effective operational time of the filtration unit (100) from this single change would have required three changes of a single filter unit of the prior art. This dramatically decreases exposure and workload of personnel.

It is presumed that any contamination threat will eventually dissipate and the outside air will again become safe to breath (either naturally or through human activity to return the air to a breathable state). At this time it is necessary to clear the unfiltered airpath (311) of any residual contaminants and begin providing unfiltered air to preserve filter life as in FIG. 4. During the transition back to an environment clear of contaminants the controller (323) also preferably initiates a purge of the unfiltered line before air is drawn through it. FIG. 7 depicts the position of the valves during this purge action. In FIG. 7, filter (307) was the filter in use prior to initiating the purge. Because of this situation the air that has passed through the air path (317) is used to purge the unfiltered path (311). Therefore, prior to the purge, valves (511), (517), (505) and (515) are open, and valves (509), (513), (503) and (507) are closed. To purge the line, the controller (323) opens valve (501) which provides air in the path back outside. After the unfiltered path (311) is cleared, the controller (323) commands the valves to the positions shown in FIG. 4 returning the filtration unit (100) to unfiltered operation.

Once in unfiltered operation, filters may then be changed as required and utilizing appropriate safety measures to insure no contamination is introduced to the shelter (10). As should be apparent from FIG. 4. In this operation the filter paths are closed on the shelter side of the filter, therefore the filter may be removed without risk of introduced contamination. However, in an embodiment, it may be desirable to maintain a filter in use when a filter is being replaced. In this way there is no danger of material captured by the filter being changed coming loose in the outside air and being introduced into the shelter (10) via the unfiltered path (311).

FIG. 8 provides for a general overview of the various valves during a plurality of different operations which can be performed. This includes those depicted in FIGS. 4-7 and also additional modes. There are a significant number of different operating and transition configurations available. These configurations help provide for safe transition where any residual contamination in a line would not be introduced into the shelter (10).

Figure 11:
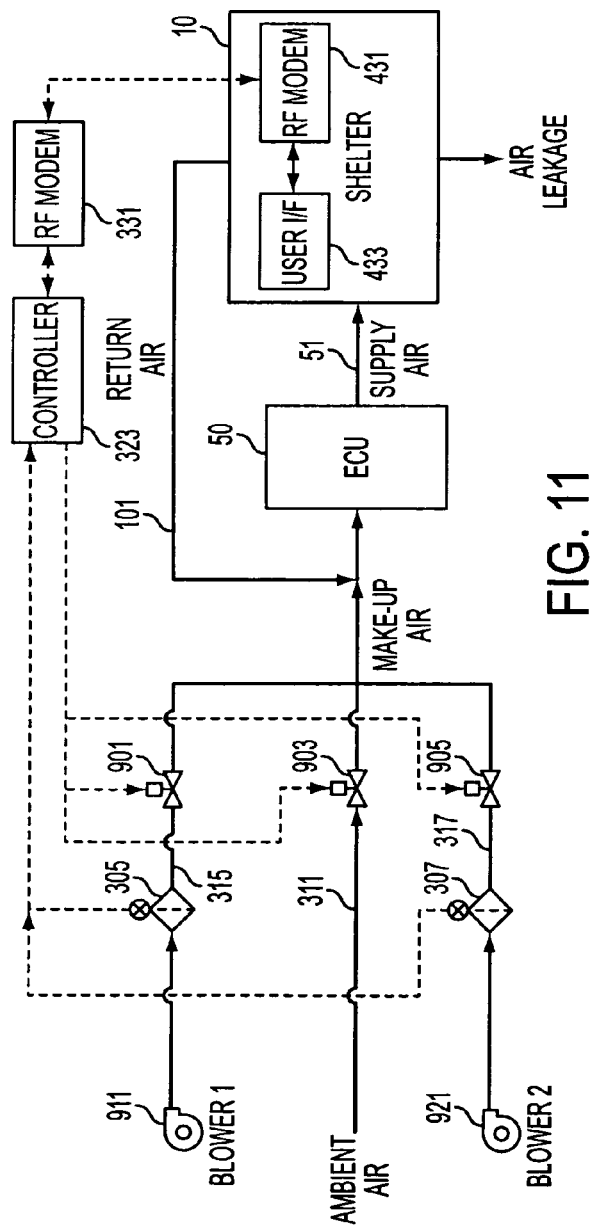
FIG. 11 Shows a schematic diagram of valve positions in an embodiment of a filtration unit utilizing two push blowers.
Figure 12:
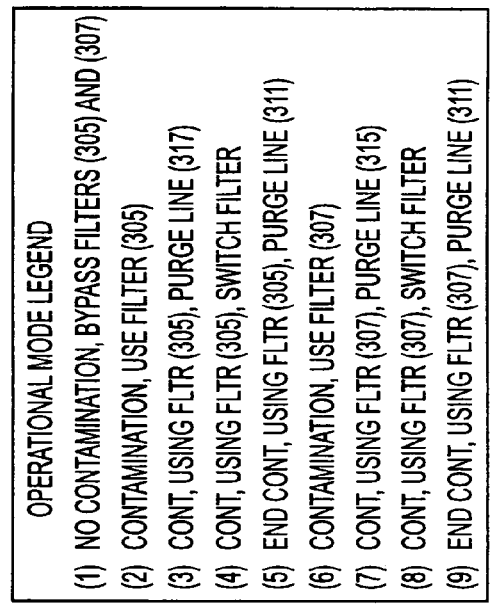
FIG. 12 Provides a chart showing valve positioning and blower control for various states of operation of the embodiment of FIG. 11.

FIGS. 9-12 provide for another two embodiments of filter arrangements. These embodiments generally correspond to the two embodiments of FIG. 3 with FIGS. 9-10 showing a system with a single blower (931) and manifold and FIGS. 11-12 showing a system with two blowers (911) and (921) (one for each filtered path). Generally, air will be pushed into the appropriate filter (305) or (307) by the appropriate blower (931), (921), or (911). There are then three valves (901), (903), and (905) which are in identical placement in both embodiments. FIGS. 10 and 12 show positions of the valves (901), (903), and (905) for different operations. It also shows the operation of blowers (931), (921), and (911). These later embodiments would generally be preferred over those of FIGS. 4-8 as they will provide improved air flow and simpler construction, but any of these arrangements, or other arrangements, may be used in different embodiments.

In an alternative configuration not discussed above, the filtration system can also be used with more than one of the airflow paths open. In particular, if a particularly high amount of filtered air is required, both paths (315) and (317) may be used simultaneously to provide for an increase in the available air that can be pulled through the filters (305) and (307). Further, if a significant amount of air is required quickly to the shelter (10) without regards for filtering, all three paths (and all blowers) may be operated simultaneously to increase air flow into the output hose (51).

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A nuclear, biological, and chemical (NBC) filtration unit for use with a portable environmental control unit (ECU) comprising:
   a first air flow path allowing air flow from an external environment, through a filtration unit, and to said ECU without said air passing through an NBC filter;
   a second air flow path allowing air flow from said environment, through an NBC filter in said filtration unit and to said ECU;
   a controller allowing said filtration unit to switch from passing air through said first air flow path to said second airflow path and from said second air flow path to said first air flow path repeatedly without said NBC filter being removed from said filtration unit; and
   a plurality of valves arranged in said first and second air flow path and controlled by said controller;
   wherein, prior to said controller switching from said second air flow path to said first air flow path, said plurality of valves are arranged so that air passes along said second air flow path from said environment through said filtration unit and said NBC filter and then through said first air flow path back to said environment to purge said first air flow path of any contaminants in said first air flow path.

2. The filtration unit of claim 1 wherein said switching between said first air flow path and said second air flow path is performed without human intervention.

3. The filtration unit of claim 1 wherein said switching between said first airflow path and said second air flow path is commanded by a human operator at a remote location.

4. The filtration unit of claim 3 wherein said remote location is inside a shelter utilizing said ECU for environmental control.

5. The filtration unit of claim 4 wherein said command is sent via a wireless technology.

6. The filtration unit of claim 5 wherein said wireless technology is Bluetooth™.

7. The filtration unit of claim 1 further comprising a third air flow path wherein air passes through another NBC filter in said filtration unit and to said ECU, said plurality of valves being distributed across said first, second and third air flow paths, and said controller can switch freely between said first, second, and third air flow paths.

8. The filtration unit of claim 7 wherein said second air flow path and said third air flow path are generally symmetrical.

9. The filtration unit of claim 7 wherein said NBC filter in said second air flow path need not be changed when it has reached the end of its useful life as said controller may switch to said NBC filter in said third air flow path.

10. The filtration unit of claim 9 wherein said plurality of valves may be arranged so that said second air flow path may be purged by air from said third air flow path when said NBC filter in said second air flow path is being changed, and said third air flow path may be purged by air from said second air flow path when said NBC filter in said third air flow path is being changed.

11. The filtration unit of claim 7 wherein each of said second and said third air flow path includes a blower.

12. The filtration unit of claim 7 further comprising an inlet manifold and a blower wherein said inlet manifold allows said blower to direct said air down either said second or said third air flow path.

13. The filtration unit of claim 12 wherein said inlet manifold also allows said blower to direct said air down both said second and said third air flow path simultaneously.

14. The filtration unit of claim 1 wherein said NBC filter comprises a deep active carbon bed filter.

15. The filtration unit of claim 1 wherein said first air flow path includes a filter which is not an NBC filter.

16. The filtration unit of claim 1 wherein said ECU is a field deployable ECU (FDECU) or light ECU (LECU).

17. The filtration unit of claim 1 wherein air is at least partially pulled through said first air path by a blower in said ECU.

18. The filtration unit of claim 1 wherein air is at least partially pushed though said NBC filter by a blower in said second air path.

19. A nuclear, biological, and chemical (NBC) filtration unit for use with a portable environmental control unit (ECU) comprising:
   a first air flow path allowing air flow from an external environment, though a first NBC filter in said filtration unit and to an ECU;
   a second air flow path allowing air flow from said environment, though a second NBC filter in said filtration unit and to said ECU;
   a controller allowing said filtration unit to switch from passing air through said first air flow path to said second airflow path and from said second air flow path to said first air flow path repeatedly; and
   a plurality of valves distributed across said first and second air flow path and controlled by said controller;
   wherein said plurality of valves may be arranged so that said first air flow path may be purged by air from said second air flow path when said NBC filter in said first air flow path is being changed, and said second air flow path may be purged by air from said first air flow path when said NBC filter in said second air flow path is being changed; and
   wherein, when an air flow path is purged, air from said purge is provided to said environment and not to said ECU.

20. The filtration unit of claim 19:
   wherein during said purging of said second air flow path, filtered air is also flowing into said ECU; and
   wherein during said purging of said third air flow path, filtered air is also flowing into said ECU.

21. A filtration unit comprising:
   means to force air through a first air flow path said first air flow path providing nuclear, biological and chemical (NBC) filtered air to a shelter;
   means to force air through a second air flow path said second air flow path providing NBC filtered air to said shelter;
   means to select which air flow path air is flowing through;
   means to purge said first air flow path using air from said second air flow path while still providing NBC filtered air to said shelter; and
   means to purge said second air flow path using air from said first air flow path while still providing NBC filtered air to said shelter.

* * * * *